Patented June 17, 1952

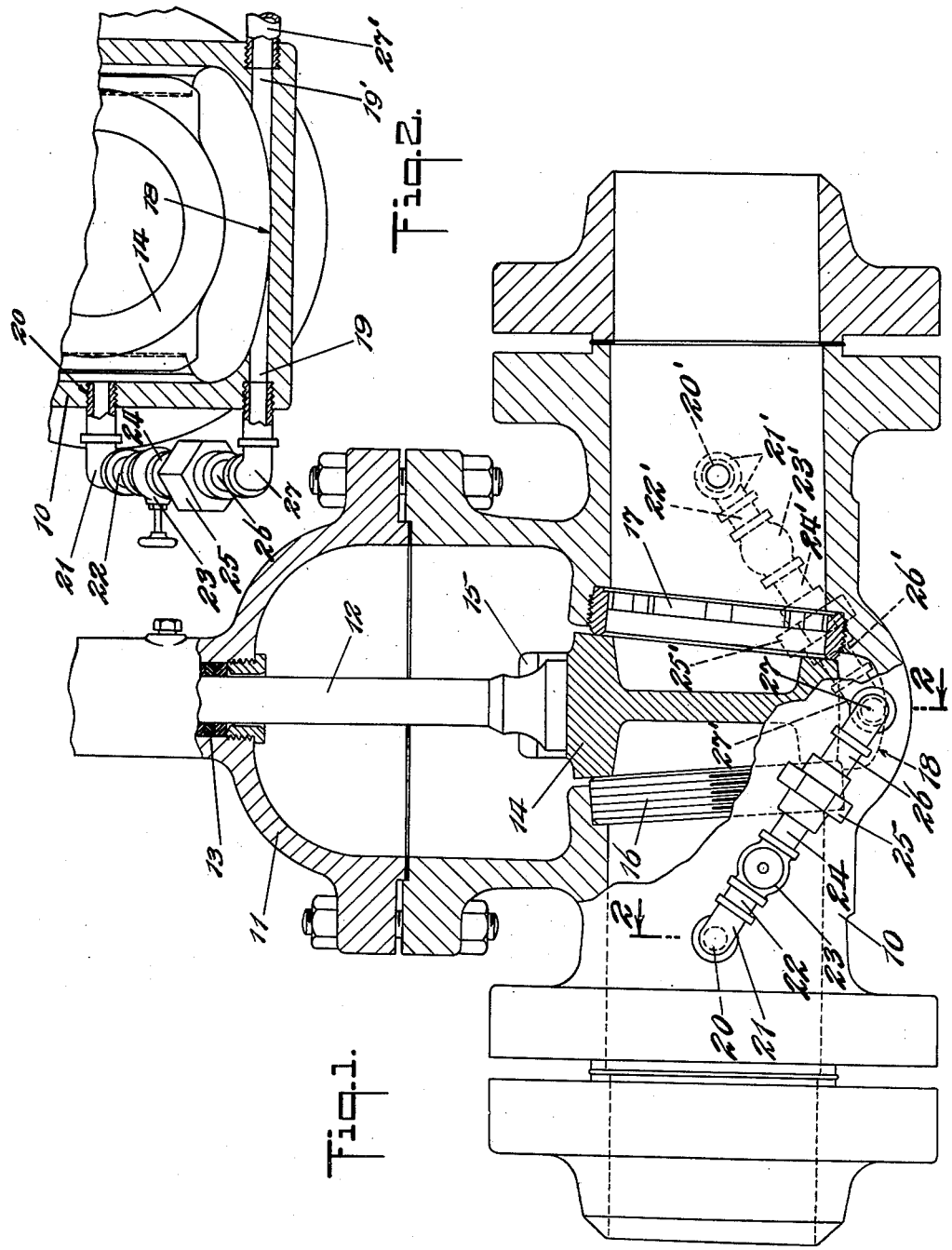

2,600,836

UNITED STATES PATENT OFFICE 2,600,836

SELF-CLEANING VALVE

Joseph W. Boyd, Bartlesville, Okla., assignor to Phillips Petroleum Company, a corporation of Delaware Application October 16, 1947, Serial No. 780,163

1 Claim. (Cl. 251—59)

This invention relates to improvements in valves.

An object of this invention is to provide a full opening gate valve which permits of the passage of scrapers or "go-devils" through the pipes connected thereto including the valve without interference from the valve structure.

Another object of this invention is to provide a tangentially acting nozzle structure incorporated as a part of the valve to clean and scour the valve body by injecting, when desired, fluid from the line containing the valve into the valve body so as to clean the valve disc guides and valve body pockets therebelow to remove rust, sediment and the like which frequently collects in these regions and prevents closing thereof.

A more specific object of the invention is to provide attachments of this kind by means of which the cleaning and scouring result can be effected for either direction of flow of fluid through the line in which the line is connected.

Other and more detailed objects of the invention will be apparent from the following disclosure of the embodiment thereof illustrated in the attached drawings.

This invention resides substantially in the combination, construction, arrangement and relative location of parts, all as will be described in detail below.

In the drawings—

Figure 1 is a vertical central cross sectional view with some parts in elevation and some parts broken away of a valve embodying the subject matter of this invention; and Figure 2 is a detailed broken cross sectional view taken on the line 2—2 of Figure 1.

In the operation of the valves and particularly gate valves, rust, sediment and other solid materials carried by the fluid passing therethrough tends to collect in the sump in the valve body below the valve disc and on the valve seat, the presence of which prevents proper closing thereof. For many uses of such valves it is necessary to close them only infrequently with the result that the sediment which deposits on and about the valve guides and sump tends to harden, thereby preventing full closing thereof.

The broad object of this invention is to provide an attachment to or a part of valves of this type by means of which a fluid jet of the fluid passing through the line to which the valve is connected from the upstream side of the valve into the region of deposit preferably in a tangential direction so as to continuously or intermittently, as required, flush this area free of sediment, rust and the like. As will appear later, the construction illustrated provides for this cleaning fluid injection for either direction of flow of fluid through the valve when conditions of flow reversal are encountered.

Another object of this invention is to provide an improvement of this type in a full opening gate valve, namely, one which when fully opened provides a passage having a minimum diameter at least equal to the internal diameter of the pipe line in which it is connected so that scrapers, "go-devils" and the like may pass therethrough without interference. More specifically, the objects of this invention are accomplished in a gate valve structure having removable gate guides of such minimum diameter. The structure by means of which these objects are attained is illustrated in the drawings.

The valve is illustrated as comprising a valve body 10 having the usual passage therethrough, a removable cap or bonnet 11 in which the valve stem 12 is journaled by means of a suitable packing gland construction 13. In accordance with a common form of construction of such valves, the lower end of the stem 12 is headed as shown, and has a rotative connection with a fixture 15 on top of the valve disc 14 so that the valve stem can be rotated with respect thereto as it raises and lowers the disc. It will be recognized that the valve stem can be rotated by a handwheel, or motor in combination with other suitable and well known mechanism, not shown, which causes the valve disc to be raised and lowered in a vertical plane.

As illustrated, the valve disc 14 is arranged to cooperate with a pair of seating rings 16 and 17 which are mounted on the valve body 10 in any suitable manner as, for example, by means of screw threads as shown. The arrangement is such that the minimum diameter of the passage through the seating rings 16 and 17 is at least equal to the diameter of the passage through the valve body. As is common practice, the valve body at the region below the plane of movement of the valve disc 14 is provided with a sump or recess 18 into which the lower end of the valve disc may move as it is driven home to seating position.

To provide a tangential cleaning fluid jet, the valve body is provided as illustrated on opposite sides with pairs of threaded ports 19 and 20 and 19' and 20'. The ports on each side are provided with a fluid connection which includes a hand valve. This connection provides a fluid bypass from the upstream side of the valve to the sump for either direction of fluid flow. To facilitate installation of these bypass lines, the construction illustrated in the drawings is employed. The ports 19 and 20 and 19' and 20' and provided with elbows 27 and 21 and 27' and 21', respectively. Connection to the elbows 21 and 21', respectively, are the hand valves 23 and 23' which are attached thereto, by means of nipples 22 and 22'. Attached to the valves respectively by means of nipples 24 and 24' are the coupling unions 25 and 25' by which means of nipples 26 and 26', attachment is made to the elbows 27 and 27'. As will be recognized, this construction facilitates installation of the bypass connections.

In the operation of this device in cases where as is frequently encountered in practice, the valve disc is only partially unseated the flow therethrough will be pinched off, creating a pressure differential on the upstream side of the valve sufficient to continuously force a stream of the fluid in the line which contains the valve through one of the bypass lines, depending upon the direction of flow of fluid. The result is that the stream passing through the bypass line that is active at the moment will produce a fluid jet tangential with respect to the valve disc and sump 18, causing a scouring and cleaning action which will clean out any sediment and rust that may have collected or tends to collect there. In those cases where the valve is normally used in full open position, it can be periodically cleaned by partially closing the valve to create a pressure differential sufficient to force fluid through one or the other of the bypass lines to produce the cleaning action explained above.

It will, of course, be understood that in cases where the direction of flow of fluid through the valve will always be in one direction, only one bypass line will be necessary.

The provision of the small hand valves 23 and/or 23' is not necessary but it may sometimes be desirable in order to close off the bypass line or lines when the main valve is closed to reduce the possibility of leakage through either side of the main valve disc.

The other feature of this construction is apparent, namely, the adaptability of the structure notwithstanding the bypass attachments so that scrappers or "go-devils" can pass throughout the line containing such valves without danger of being trapped in the valve. To insure against catching of the scraper in the valve, it will be noted that the removable seating rings 16 and 17 are so mounted that they form no projection or shoulder in a downstream direction against which the scraper might lodge. The internal diameters of both the upstream and downstream sides of the seating rings are at least as great as the diameter of the passage through the valve so that a scraper will not lodge thereagainst regardless of its direction of movement therethrough. Likewise, the bypass connections previously described are installed so that they likewise provide no obstructions within the main valve body.

From the above description it will be apparent to those skilled in the art that the subject matter of this invention is capable of some variation and I do not therefore desire to be limited except as required by the appended claim.

What is claimed is:

In a gate valve, the combination comprising a valve body having a clear passage therethrough of at least the diameter of pipe approaches to the valve, a pair of demountable seating members in said valve body providing a pair of seats, said valve body having a sump formed below said seating members, a valve gate mounted for movement in a vertical plane, seating members having a pair of seats thereon complementing the said first pair of seats, a conduit connecting said sump with the pipe approach to the valve to permit discharge of a jet of fluid therefrom through the sump below said valve body, transversely across the stream substantially at right angles to the direction of main stream fluid flow and about tangential to the stream, the discharge being effective to induce a churning and swirling action in the sump, whereby accumulations of settlings may be carried up into the stream of fluid passing through the valve for removal from the zone of the valve.

JOSEPH W. BOYD.

REFERENCES CITED

The following references are of record in the file of this patent:

UNITED STATES PATENTS

| Number | Name | Date |
| --- | --- | --- |
| 127,768 | Hewes | June 11, 1872 |
| 286,656 | Van Wie | Oct. 16, 1883 |
| 721,453 | Lunken | Feb. 24, 1903 |
| 1,648,071 | Sparks | Nov. 8, 1927 |
| 1,941,443 | Moran | Dec. 26, 1933 |
| 2,466,946 | Groom | Apr. 12, 1949 |